(12) United States Patent
Poinstingl

(10) Patent No.: US 6,224,324 B1
(45) Date of Patent: May 1, 2001

(54) AXIAL-FLOW TURBINE

(76) Inventor: Georg Poinstingl, Weilburgstrasse 10/9/6, A-2500 Baden (AT)

( * ) Notice: Subject to any disclaimer, the term of this patent is extended or adjusted under 35 U.S.C. 154(b) by 0 days.

(21) Appl. No.: 09/353,892

(22) Filed: Jul. 15, 1999

(30) Foreign Application Priority Data

Jul. 16, 1998 (AT) .................................... 1229/98

(51) Int. Cl.$^7$ .................................... F01D 1/24
(52) U.S. Cl. .............................. 415/68; 416/128
(58) Field of Search .................... 415/68, 65, 66, 415/61, 69, 60, 62, 63, 64, 67; 416/128, 129

(56) References Cited

U.S. PATENT DOCUMENTS

| | | | |
|---|---|---|---|
| 977,107 | 11/1910 | Loftus | 415/69 |
| 2,522,443 | * 9/1950 | Gaubatz et al. | 475/332 |
| 4,751,816 | * 6/1988 | Perry | 60/226.1 |
| 4,793,773 | * 12/1988 | Kinouchi et al. | 416/129 |
| 5,010,729 | * 4/1991 | Adamson et al. | 60/226.1 |
| 5,030,149 | * 7/1991 | Fujita | 440/75 |

FOREIGN PATENT DOCUMENTS 118 916    3/1976   (DE) .

* cited by examiner

Primary Examiner—Edward K. Look
Assistant Examiner—Hermes Rodriguez
(74) Attorney, Agent, or Firm—Collard & Roe PC

(57) ABSTRACT

An axial turbine or axial compressor with bladed rotors (6, 7) rotating in opposite directions about a common axis, in particular for the expansion of steam and hot gases or for compressing gases, with mutually adjacent bladed rotors (6, 7) being mutually connected in a non-positive manner by way of the same toothed gearing (11, 12, 13, 14). In order to propose a respective design which allows applying the contra-rotating capability of axial flow turbines with a contra-rotating gear outside of the gear housing also in the case of several turbine wheels, and thus utilizing the aforementioned advantages which are inherent to this principle, namely of claiming higher pressure heads, it is provided that all bladed rotors (6, 7) rotating in the same direction of rotation are mutually connected by way of a rigid connecting element (5, 8).

5 Claims, 1 Drawing Sheet

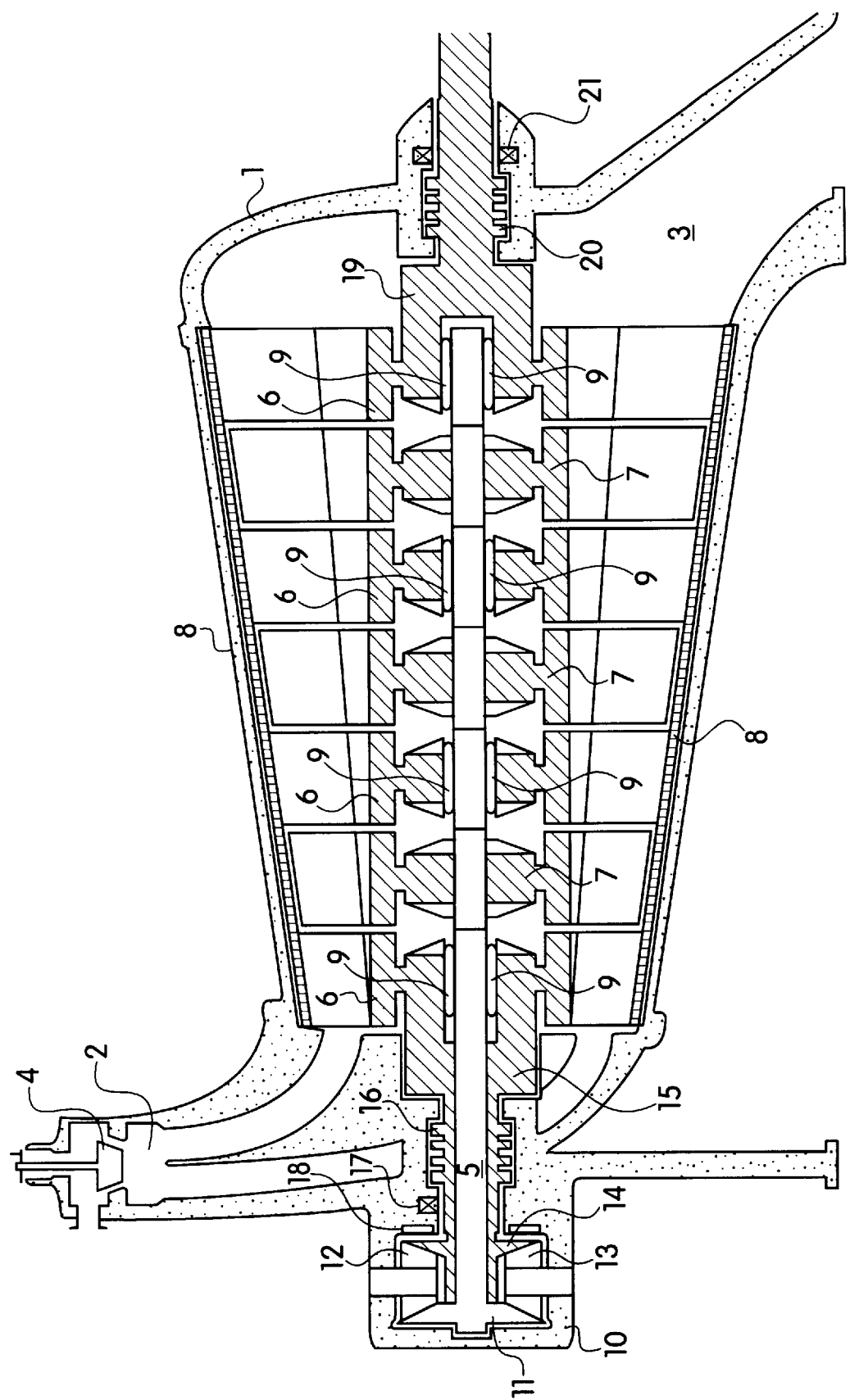

AXIAL-FLOW TURBINE

The present invention relates to a hot pressure medium operated engine, such as an axial-flow turbine compressor with contra-rotating, bladed rotors.

Birotary turbines, which are so-called contra-rotating turbines, are already known from the construction of steam turbines. Particularly contra-rotating radial flow turbines according to Ljungström are used in this area for special fields of application. As can be seen from the name, they concern radial turbines. Two bladed disk wheels each rotate in a mutually opposite direction and each drives a turbogenerator. The bladings work into each other, so that the steam drives the two disk wheels with the same output. The blade profiles are arranged in such a way that the moving blades of every blade ring are simultaneously the guide blades for the subsequent blade rings.

The main advantage in contra-rotating turbines is the fact that the blade wheels rotate with the same speed in the opposite direction and that no guide grates for charging the blade rings are present. As a result of the contra-rotation, the relative angular velocity thus doubles as compared with the preceding blade ring. The specific work converted in two successive blade rings is therefore four times as high as in idle guide blades, so that twice the output is assigned to each moving blade ring. By replacing the guide blades with working ones such turbines operate substantially more efficiently. A disadvantage of such radial flow turbines is the fact, however, that it is necessary to use two turbogenerators, since both blade wheels transmit their torque to two shafts which also rotate in opposite directions.

It is known from U.S. Pat. No. 977,107 that adjacent bladed rotors are connected non-positively by means of toothed gearings which are arranged between the rotors. As a result of the large number of toothed gearings which depend on the number of stages of the turbines or compressors, frictional losses are incurred which cannot be neglected and negatively influence the overall efficiency of the turbine or the compressor. Moreover, the production is expensive and work-intensive.

From DD 118 916 A it is known to use a contra-rotating gear disposed outside of the turbine housing. DD 118 916 A discloses this solution only for the application of a two-stage turbine, i.e. a turbine with two turbine wheels. In this way it is not possible to process any high pressure heads.

The present invention has the object of providing a design which, in a simple manner, allows applying the contra-rotation of axial flow turbines with a contra-rotating gear arranged outside of the turbine housing even in the case of several turbine wheels and thus claiming the aforementioned advantages which are inherent to this principle, namely higher pressure heads.

This is achieved in accordance with the invention with a hot pressure medium operated engine comprising a series of bladed rotors arranged adjacent each other in an axial direction, a first group of said bladed rotors being rotated in a first direction by a hot pressure medium applied thereto, and a second group of said bladed rotors whose bladed rotors alternate with the bladed rotor blades of the first group being rotated in a direction opposite to the first direction. A first rigid connecting element connects the bladed rotors of the first group for rotating in unison, a second rigid connecting element connects the bladed rotors of the second group for rotating in unison, and a gearing connects the first group of bladed rotors to the second group for reversing the first direction of rotation and for rotating the second group of bladed rotors in the opposite direction.

In this way the contra-rotating capability of all adjacent rotors can be achieved by way of a reversing gear.

In accordance with a preferred embodiment, the first rigid connecting element is a hollow element rigidly connected to radially outer ends of the bladed rotors of the first group so that all rotors rotating in one direction are mutually rigidly connected, thus merely requiring the driving of one rotor for producing the motion of rotation.

The second rigid connecting element may be a shaft on which the bladed rotors of the second group are rigidly arranged, the shaft being rotatable about an axis of rotation coinciding with a common axis of rotation of the bladed rotors of the first and second groups, and the bladed rotors of the first group being rotatably mounted on the shaft, so that all rotors rotating in the other direction are mutually rigidly connected.

Preferably, the gearing comprises a first bevel gear keyed to the rotatable shaft, a second bevel gear keyed to a hollow shaft stub rigidly connected to a first one of the bladed rotors of the first group closest to an inlet of the hot pressure medium, and at least one additional bevel gear between the first and second bevel gears, and in engagement therewith, so that the two rigid elements are connected by means of a contra-rotating gear, thus enabling all rotors to be driven simultaneously with one gear.

The invention is now explained in closer detail on the basis of an example by reference to the attached FIGURE, which shows a sectional view through an embodiment of an axial flow turbine in accordance with the invention.

The FIGURE schematically shows a turbine housing 1 which is provided with a steam inlet port 2 and a steam outlet port 3 as well as a control valve 4, a shaft 5, which is rotatably held in housing 1. Alternate bladed rotors 6 rotate in the same direction and the ends of their blades are connected by hollow-cylindrical element 8 so that they rotate in unison. Roller bearings 9 support rotors 6 on shaft 5. The rotors 7 rotating in the opposite direction are fixedly arranged on shaft 5. As a result, rotors 6, 7 rotating in the same direction jointly form a rotational unit.

In the end zone of shaft 5 which penetrates the turbine housing 1 and which ends in an adjacent gear housing 10 a bevel gear 11 is arranged whose axis is aligned with the axle of the shaft 5 and which is in engagement with a further bevel gear 14 by way of bevel gears 12, 13. Bevel gear 14 is arranged flush on a hollow shaft stub 15 which extends concentrically to the shaft 5 and is formed on the bladed rotor 6 disposed closest to steam inlet port 2 in the direction of expansion of the steam. The shaft stub 15 is supported in the bearing 17 and on the thrust bearing 18 and is sealed off by labyrinth gland 16. Shaft 5 extends into the interior of housing 1.

When the turbine is charged with steam, the first rotor 6 as seen in the direction of expansion begins to rotate and drives all bladed rotors 6 connected to each other by hollow-cylindrical element 8. Simultaneously, through the shaft stub 15 which is formed on the first rotor the motion of rotation is transmitted by way of bevel gears 11, 12, 13 and 14 onto shaft 15, with the direction of rotation of shaft 5 having been reversed with respect to the direction of rotation of hollow shaft stub 15.

The bladed rotors 7 which are fixedly arranged on the shaft 5 thus rotate in the opposite direction of the rotors coupled by way of the cylindrical connecting element.

A hollow stub shaft 19 is attached to the rotor 6 disposed in the direction of expansion of the pressure fluid medium, which stub shaft leaves the turbine housing 1 by way of a labyrinth gland 20 and a bearing 21 in order to drive a generator or a marine screw propeller for example.

The realization of the apparatus in accordance with the invention is not limited to merely turbines, but can also be employed in an analogous manner in compressors.

What is claimed is:

1. A hot pressure medium operated engine comprising
   (a) a series of bladed rotors arranged adjacent each other in an axial direction,
      (1) a first group of said bladed rotors being rotated in a first direction by a hot pressure medium applied thereto, and
      (2) a second group of said bladed rotors whose bladed rotors alternate with the bladed rotor blades of the first group being rotated in a direction opposite to the first direction,
   (b) a first rigid connecting element connecting the bladed rotors of the first group for rotating in unison,
   (c) a second rigid connecting element connecting the bladed rotors of the second group for rotating in unison, and
   (c) a gearing connecting the first group of bladed rotors to the second group for reversing the first direction of rotation and for rotating the second group of bladed rotors in the opposite direction.

2. The hot pressure medium operated engine of claim 1, wherein the first rigid connecting element is a hollow element rigidly connected to radially outer ends of the bladed rotors of the first group.

3. The hot pressure medium operated engine of claim 1, wherein the second rigid connecting element is a shaft on which the bladed rotors of the second group are rigidly arranged, the shaft being rotatable about an axis of rotation coinciding with a common axis of rotation of the bladed rotors of the first and second groups, and the bladed rotors of the first group being rotatably mounted on the shaft.

4. The hot pressure medium operated engine of claim 3, wherein the gearing comprises a first bevel gear keyed to the rotatable shaft, a second bevel gear keyed to a hollow shaft stub rigidly connected to a first one of the bladed rotors of the first group closest to an inlet of the hot pressure medium, and at least one additional bevel gear between the first and second bevel gears, and in engagement therewith.

5. The hot pressure medium operated engine of claim 4, wherein the shaft is guided through the hollow shaft stub.

\* \* \* \* \*